(12) United States Patent
Liang

(10) Patent No.: US 8,240,980 B1
(45) Date of Patent: Aug. 14, 2012

(54) TURBINE INTER-STAGE GAP COOLING AND SEALING ARRANGEMENT

(75) Inventor: George Liang, Palm City, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 1265 days.

(21) Appl. No.: 11/975,670

(22) Filed: Oct. 19, 2007

(51) Int. Cl.
F01D 5/08 (2006.01)
(52) U.S. Cl. .......................... 415/115; 415/176
(58) Field of Classification Search .............. 415/115, 415/116, 173.1, 173.2, 173.5, 176
See application file for complete search history.

(56) References Cited

U.S. PATENT DOCUMENTS

| | | |
|---|---|---|
| 4,050,843 A | 9/1977 | Needham et al. |
| 4,177,004 A | 12/1979 | Riedmiller et al. |
| 4,303,371 A | 12/1981 | Eckert |
| 4,485,620 A | 12/1984 | Koenig et al. |
| 4,497,610 A | 2/1985 | Richardson et al. |
| 4,573,865 A | 3/1986 | Hsia et al. |
| 4,642,024 A | 2/1987 | Weidner |
| 4,752,184 A | 6/1988 | Liang |
| 5,593,278 A | 1/1997 | Jourdain et al. |
| 5,609,469 A | 3/1997 | Worley et al. |
| 5,639,210 A | 6/1997 | Carpenter et al. |
| 6,139,257 A | 10/2000 | Proctor et al. |
| 6,302,642 B1 | 10/2001 | Nagler et al. |
| 6,530,744 B2 | 3/2003 | Liotta et al. |
| 6,607,350 B2 * | 8/2003 | Dodd .............................. 415/14 |
| 6,814,538 B2 | 11/2004 | Thompson |
| 6,896,484 B2 | 5/2005 | Diakunchak |

FOREIGN PATENT DOCUMENTS

GB 2024336 A * 1/1980

* cited by examiner

Primary Examiner — Edward Look
Assistant Examiner — Jesse Prager
(74) Attorney, Agent, or Firm — John Ryznic

(57) ABSTRACT

An industrial gas turbine engine having a first stage rotor blade with a outer segmented shroud forming a blade outer air seal with the blade tips and a second stage stator vane assembly which forms an axial inter-stage gap between an isolation ring that supports the outer shroud segment and the outer endwall of the vane. The isolation ring and the outer endwall both include a circumferential rail extending into the gap to form a serpentine flow passage in the gap. The outer shroud segment includes an aft edge extending outward to form the serpentine flow passage within the gap. Cooling air holes in the aft edge of the outer shroud segment discharge cooling air from the impingement cavity located above the shroud segment into a continuous slot opening into the inner end of the serpentine flow passage in the gap.

11 Claims, 3 Drawing Sheets

Cold State

Hot State

TURBINE INTER-STAGE GAP COOLING AND SEALING ARRANGEMENT

FEDERAL RESEARCH STATEMENT

None.

CROSS-REFERENCE TO RELATED APPLICATIONS

None.

BACKGROUND OF THE INVENTION

1. Field of the Invention

The present invention relates generally to an industrial gas turbine engine, and more specifically to a cooling and sealing arrangement for a first stage blade outer air seal and second vane airfoil.

2. Description of the Related Art including information disclosed under 37 CFR 1.97 and 1.98

In a gas turbine engine, a compressor delivers compressed air into a combustor to be burned with a fuel and produce a hot gas flow, which is then passed through a turbine to drive the compressor and, in an industrial gas turbine (IGT) engine, also to drive an electric generator.

An industrial gas turbine engine has several major design differences from an aero engine which is used to power an aircraft. An IGT is much larger and is designed to operate for long periods of time between shut-downs, typically in the range of 48,000 hours. In the turbine section, stages of rotor blades rotate within the engine. The rotor blade tips form a gap with an outer shroud assembly to limit the amount of hot gas flow leakage through this gap. The outer shrouds are formed of segments that are secured in place to the engine casing. FIG. 1 shows a prior art arrangement. The shroud segment 11 is secured between two isolation rings 13 and 14 that extend from the engine casing 15. A gap in which the hot gas can enter is formed between the isolation ring 14 and the adjacent vane shroud 16 in which the vane airfoil 17 extends. An aero engine does not use these isolation rings because of the heavy weight. In the aero engine, the outer shrouds are secured directly to the engine casing. As such, the stator vanes in the aero engine cannot be removed from the engine without disassembling the entire turbine section.

In the IGT, the isolation rings allow for the stator vanes to be removed without having to disassemble the rest of the turbine. The stator vanes can be removed radially outward without removing the outer shroud segments. Because of this arrangement in the IGT outer shroud and isolation ring structure, a gap is formed between the shroud segments and the adjacent stator vane assembly. FIG. 1 shows this prior art turbine inter-stage structure for the first stage blade outer air seal (BOAS) and second vane airfoil. In this type of blade outer air seal with downstream vane component design, there is no sealing or cooling arrangement to prevent the hot gas ingression along the axial gap. As a result, hot gas flows in and out along the inter-stage gaps and an over-temperature occurs at the blade outer air seal edges and the blade isolation ring corresponding to the hot gas injection location. this over-temperature issue is more pronounced when a lack of adequate inter-stage gap purge air for the axial gap exists in combination with a strong bow wave induced by the low solidity vane airfoil creates a high circumferential pressure variation that will force the hot gas into the inter-stage gap.

A prior art reference U.S. Pat. No. 4,177,044 issued to Riedmiller et al on Dec. 4, 1979 and entitled COMBINED TURBINE SHROUD AND VANE SUPPORT STRUCTURE discloses an aero gas turbine engine with a shroud segment forming a blade tip gap with the first stage turbine blades in which the shroud segment includes a plurality of axial holes (66 in the Riedmiller patent) that open into a shroud rear groove and a plurality of axial slots formed underneath an inner flange extending into the shroud rear groove from the vane assembly. Cooling air flows into an impingement cavity of the outer shroud and then through the axial holes and axial slots and into the gap to prevent hot gas from injecting into the gap. The main difference between the Riedmiller patent and the present invention is that the Riedmiller structure is for an aero engine and not an IGT. In the aero engine of the Riedmiller patent, the adjacent vane cannot be removed in the radial direction because of the inner flange extending into the shroud rear groove. Thus, the adjacent vane assembly cannot be removed from the engine without disassembling the shroud segments as well. Also, the Riedmiller patent lacks the use of the isolation rings to support the shroud segments.

BRIEF SUMMARY OF THE INVENTION

It is therefore an object of the present invention to provide for an industrial gas turbine engine which limits the injection of hot gas in the gap formed between the isolation ring and the adjacent stator vane assembly.

It is another object of the present invention to prevent an over-temperature of the isolation ring and the shroud segment.

It is another object of the present invention to prevent cracking of the outer shroud segment in the industrial gas turbine engine.

DETAILED DESCRIPTION OF THE INVENTION

Figure 1:
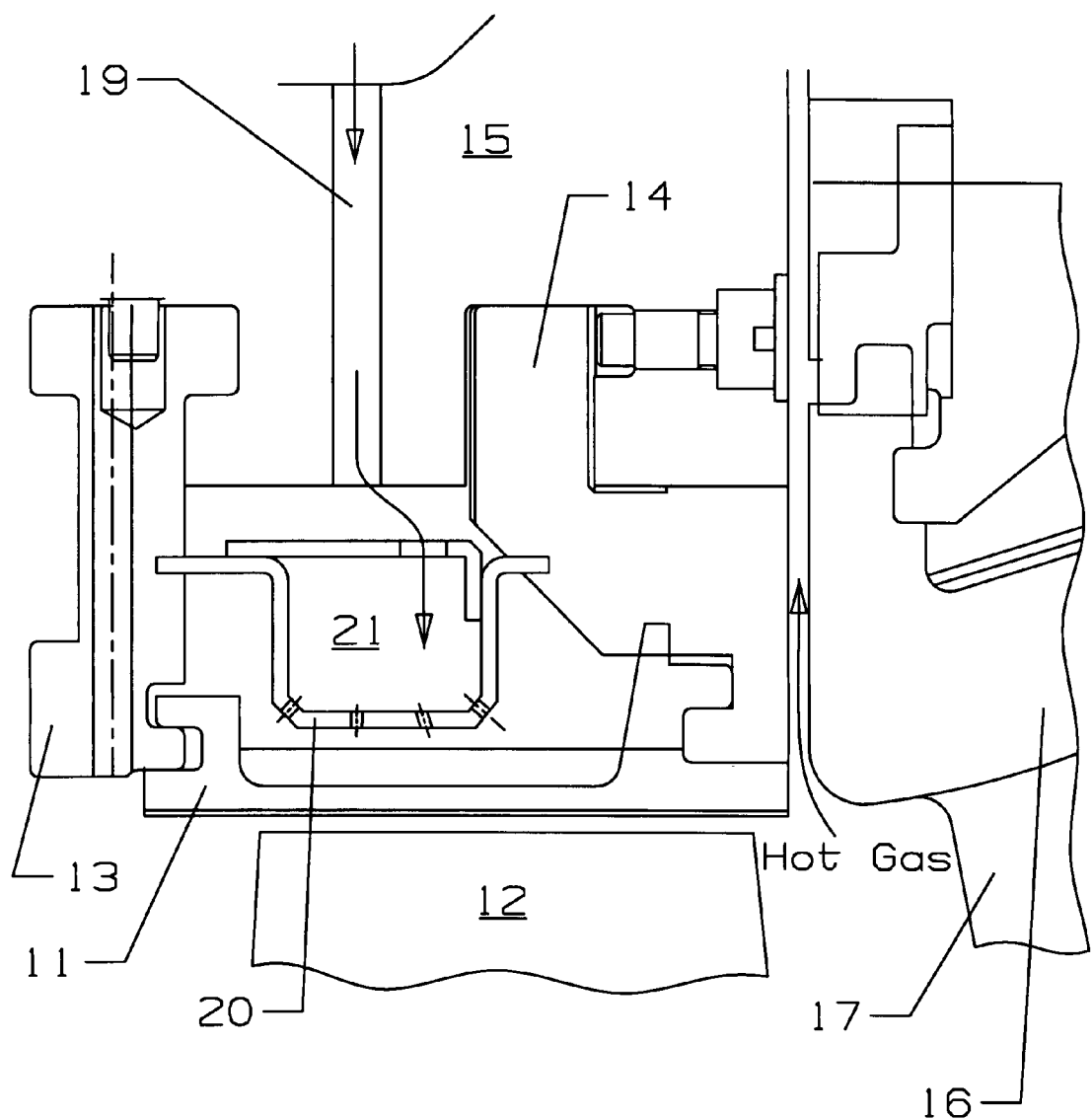
FIG. 1 shows a prior art IGT inter-stage arrangement for the first stage blade outer air seal and the second vane airfoil.
Figure 2:
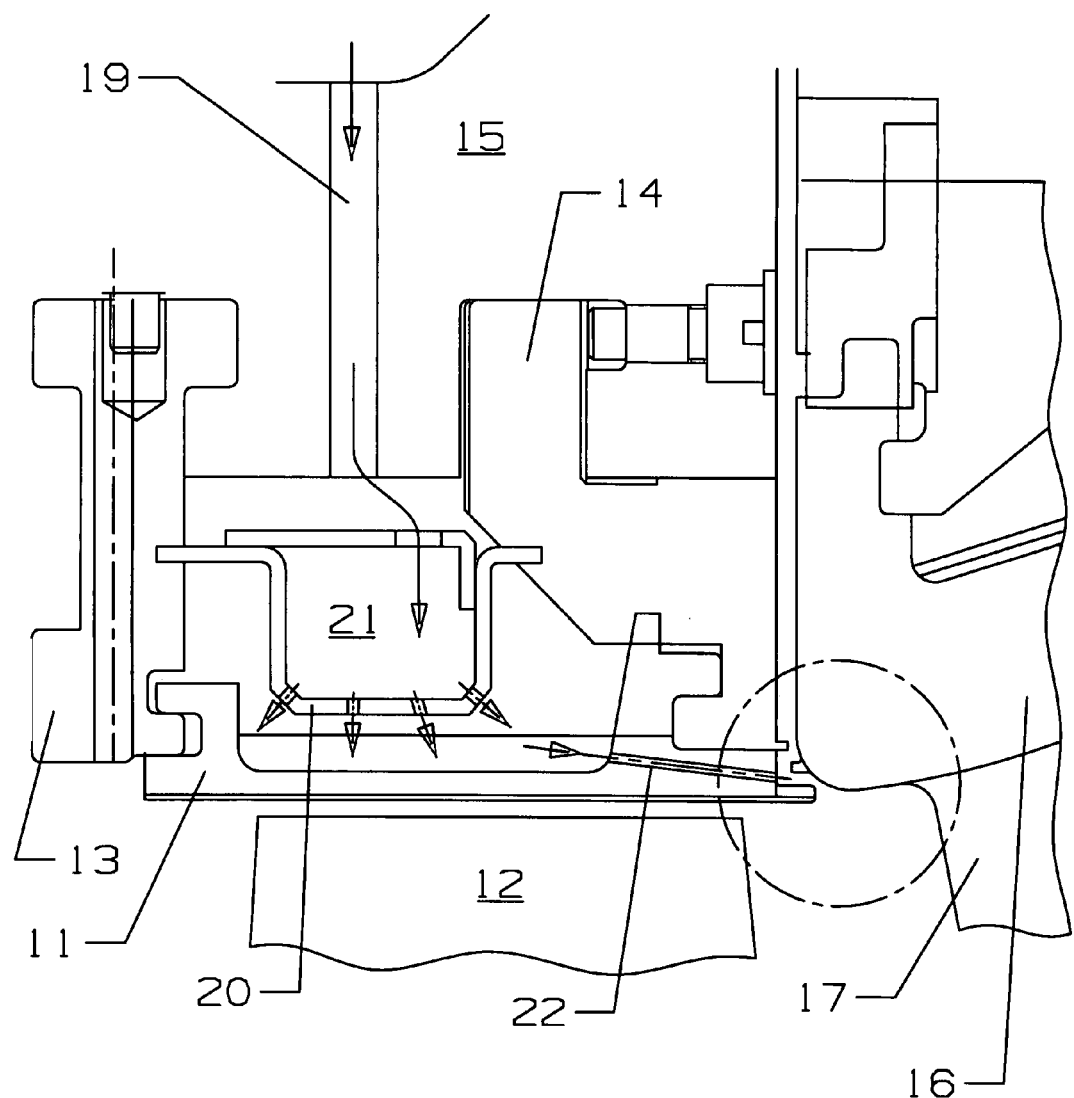
FIG. 2 shows the IGT inter-stage arrangement for the first stage blade outer air seal and the second vane airfoil of the present invention.

The present invention is a cooling and sealing apparatus and method for an outer diameter inter-stage gap between the first blade ring and the second ring of an industrial gas turbine engine. FIG. 2 shows the first stage turbine rotor blade and outer shroud segment structure adjacent top the second stage stator vane assembly. The turbine rotor blade 12 includes a blade tip that forms a gap between the outer shroud segment 11. The outer shroud segment 11 is secured within a forward isolation ring 13 and an aft isolation ring 14, both isolation rings being secured to the turbine casing 15. An impingement plate 20 with impingement holes forms a cavity 21 in which cooling air is supplied through a cooling hole 19 in the turbine casing 15. A stator vane outer endwall 16 with a vane airfoil 17 extending from the endwall is secured to the turbine casing 15 adjacent to the aft isolation ring 14 and blade shroud segment 11 and forms an inter-stage axial gap between in which the hot gas flow can enter.

Figure 3:
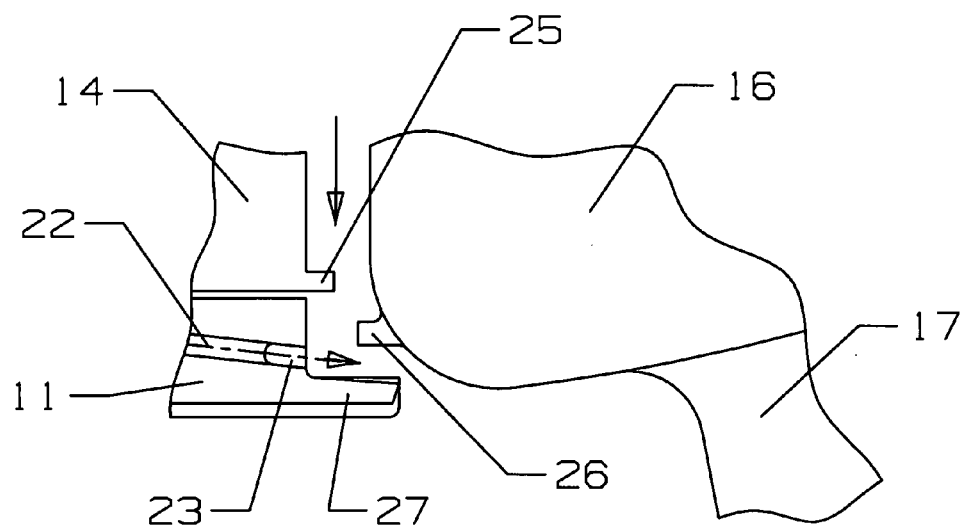
FIG. 3 shows a detailed cross section view of the cooling and sealing structure of the present invention in the cold state.

The improvement in the present invention is best seen in FIG. 3 in which the aft end of the shroud segment 11 includes a plurality of metering cooling holes 22 connecting the impingement cavity located immediately above the shroud segment to the gap. The metering cooling holes 22 open into a continuous cooling slot 23 extending around the shroud segment 11. The aft isolation ring 14 includes a circumferential rail extending into the inter-stage axial gap and toward the vane outer endwall 16. The vane outer endwall 16 includes a circumferential rail 26 that extends into the inter-stage axial gap but at a different radial height than the rail 25 on the isolation ring 14. The shroud segment 11 of the BOAS includes a circumferential rail 27 that extends into the inter-stage axial gap toward the vane endwall 16. The BOAS rail 27 on the shroud segment 11 is machined onto the top of the aft edge of the BOAS. The three rails form a serpentine passage in the gap that reduces the hot gas injection into the inter-stage axial gap as described below in more detail. FIG. 3 represents the cold state of the cooling and sealing structure of the present invention.

Figure 4:
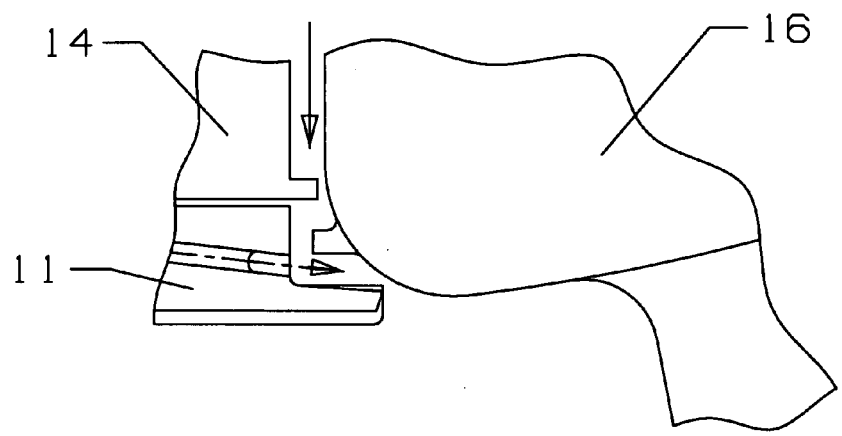
FIG. 4 shows a detailed cross section view of the cooling and sealing structure of the present invention in the hot state.

FIG. 3 shows the cold state of the cooling and sealing structure of the present invention. the isolation ring rail 25 extends into the inter-stage axial gap such that a positive space is formed with the vane shroud rail 26 in order that the vane assembly 16 and 17 can be removed in the radial outward direction without the vane shroud rail 26 abutting against the rail 25 on the isolation ring 14. This positive space can be minimal as long as the rails will not abut during removal of the vane. FIG. 4 shows the hot state in which the isolation ring rail 25 and the vane shroud rail 26 has grown toward each other such that the space becomes negative. The rails form a ship lap arrangement for the blade outer air seal (BOAS) and isolation ring. The overlapping formation by the series of three circumferential rails and the serpentine flow of cooling air functions to minimize the hot gas ingression along the inter-stage gap and prevent over-temperature for the isolation ring and the BOAS. Cracking of the shroud segment of the BOAS is also prevented.

In operation, cooling air is impinged onto the backside of the blade outer air seal. The spent cooling air is then discharged along the BOAS peripheral holes for cooling of the BOAS edges. A portion of the cooling air is used for the inter-stage rail cooling and is bled through the metering cooling holes 22 and then diffused into the circumferential continuous slot 23. This cooling air combined with purge air from above the rails is then discharged into the inter-stage axial gap. The spent cooling air is finally discharged into the hot flow path to provide film cooling for the vane outer diameter endwall 16 leading edge. The combination effects of the metering and diffusion cooling air distribution and injecting spent air directly into the ship-lap cavity provides for a very effective cooling and sealing arrangement for the inter-stage gap.

I claim the following:

1. In a gas turbine engine having an outer shroud segment secured to an isolation ring forming a gap with a tip of a rotor blade, and a stator vane with an outer endwall located adjacent to the outer shroud segment and forming an axial inter-stage gap, an improvement comprising:
   the isolation ring having a circumferential rail extending into the axial inter-stage gap;
   the vane outer endwall having a circumferential rail extending into the axial inter-stage gap;
   the outer shroud segment having a circumferential rail extending in an aft direction;
   the outer shroud segment having a cooling hole connecting the impingement cavity of the outer shroud segment to the axial inter-stage gap to discharge cooling air into the axial inter-stage gap; and,
   the rails on the isolation ring, the endwall and the shroud segment form a serpentine flow passage in the axial inter-stage gap.

2. The gas turbine engine of claim 1, and further comprising:
   the isolation ring rail is located radially outward of the endwall rail.

3. The gas turbine engine of claim 1, and further comprising:
   the cooling hole in the outer shroud segment opens into the gap at a location below the endwall rail.

4. The gas turbine engine of claim 3, and further comprising:
   the cooling hole opens in a direction and a location to discharge cooling air to provide film cooling for the outer endwall surface.

5. The gas turbine engine of claim 1, and further comprising:
   the outer shroud segment includes a continuous slot opening into the axial inter-stage gap and a plurality of cooling holes discharging the cooling air into the slot.

6. The gas turbine engine of claim 1, and further comprising:
   a spacing formed between the isolation ring rail end and the endwall rail tip end is positive in the cold state and negative in the hot state of the engine in order to allow removal of the vane without removing the isolation ring.

7. The gas turbine engine of claim 1, and further comprising:
   the isolation ring is associated with the first stage blade and the endwall is associated with the second stage vane of an industrial gas turbine engine.

8. A rotor blade and stator vane assembly for a gas turbine engine comprising:
   an outer shroud segment supported by an isolation ring within the turbine section of the engine, the outer shroud segment forming a gap with a tip of the rotor blade;
   the stator vane having an outer endwall and a forward side opposed to the isolation ring and forming an axial inter-stage gap; and,
   the outer shroud segment comprising a cooling hole to pass cooling air from an impingement cavity located above the outer shroud segment and into the axial inter-stage gap;
   the outer shroud segment comprising an aft edge extending at least a distance beyond the forward side of the outer endwall surface that forms the axial inter-stage gap;
   the cooling hole in the outer shroud segment discharges the cooling air onto an upper surface of the aft edge extension of the shroud segment;
   the isolation ring comprises a circumferential rail extending into the inter-stage gap; and,
   the outer endwall comprises a circumferential rail extending into the inter-stage gap at a location between the isolation ring rail and the shroud segment aft extension to form a serpentine flow passage within the inter-stage gap.

9. The rotor blade and stator vane assembly of claim 8, and further comprising:
   the cooling hole opens into a continuous slot on the aft edge of the outer shroud segment.

10. The rotor blade and stator vane assembly of claim 8, and further comprising:
    the rotor blade is a first stage rotor blade for an industrial gas turbine engine; and,
    the stator vane is a second stage vane for the engine.

11. The rotor blade and stator vane assembly of claim 8, and further comprising:
    the isolation ring rail and the outer endwall rail both have rail tips that extend into the gap and form a positive spacing at an engine cold state and a negative spacing at an engine hot state.

* * * * *